UNITED STATES PATENT OFFICE.

GEORGE BRICKER, SR., OF NEWVILLE, ASSIGNOR TO HIMSELF AND GEO. B. HAMMER, OF HARRISBURG, PENNSYLVANIA.

IMPROVED PROCESS OF VARNISHING AND POLISHING WOOD.

Specification forming part of Letters Patent No. 49,192, dated August 1, 1865.

*To all whom it may concern:*

Be it known that I, GEORGE BRICKER, Sr., of Newville, Cumberland county, in the State of Pennsylvania, have invented or discovered a new and Improved Process of Preparing and Polishing Wood; and I do hereby declare that the following is a full, clear, and exact description thereof.

To enable others skilled in the art to understand and use my invention, I will proceed to describe it.

I first prepare the wood, of any desired kind, in the ordinary manner, by planing, &c., and then apply to its surface a solution of potash for the purpose of "raising the grain," as it is technically termed. This solution of potash consists simply of potash dissolved in pure soft water. After the wood has become thoroughly dry I then apply a coating of oil and smooth down the surface by the aid of pumice-stone, which cuts away the raised portions of the grain of the wood and fills up the pores. I then prepare a varnish composed of gum-sandarac dissolved in pure alcohol, which is applied to the surface of the wood prepared as above described, and let it dry. I then mix, in equal proportions, raw linseed-oil and pure alcohol, and apply it to the varnished surface with cloths, and polish it down by the use of a cloth rubber, which completes the process.

By these means I am enabled to produce a beautiful and durable polish upon woods of any kind in a much cheaper and more expeditious manner than can be done by the ordinary processes now in use, thus saving immensely in time, labor, and money.

Another advantage of my improved process is that the varnish thus prepared and applied is not affected or injured by water, as the ordinary varnishes are.

Having thus fully described my invention, what I claim is—

The process herein described of varnishing and polishing wood, substantially as set forth.

GEO. BRICKER, SR.

Witnesses:
W. C. DODGE,
P. T. DODGE.